United States Patent
Desclos et al.

(10) Patent No.: US 9,804,272 B2
(45) Date of Patent: Oct. 31, 2017

(54) GPS LOCATION SYSTEM USING MODAL ANTENNA

(71) Applicants: Laurent Desclos, San Diego, CA (US); Sebastian Rowson, San Diego, CA (US); Jeffrey Shamblin, San Marcos, CA (US)

(72) Inventors: Laurent Desclos, San Diego, CA (US); Sebastian Rowson, San Diego, CA (US); Jeffrey Shamblin, San Marcos, CA (US)

(73) Assignee: Ethertronics, Inc., San Diego, CA (US)

(*) Notice: Subject to any disclaimer, the term of this patent is extended or adjusted under 35 U.S.C. 154(b) by 530 days.

(21) Appl. No.: 14/465,686

(22) Filed: Aug. 21, 2014

(65) Prior Publication Data

US 2015/0130661 A1 May 14, 2015

Related U.S. Application Data (63) Continuation-in-part of application No. 13/557,182, filed on Jul. 24, 2012, now Pat. No. 9,110,160.

(60) Provisional application No. 61/511,109, filed on Jul. 24, 2011.

(51) Int. Cl.
| | | |
|---|---|---|
| H04B 7/185 | (2006.01) | |
| G01S 19/36 | (2010.01) | |
| H01Q 3/44 | (2006.01) | |
| H01Q 1/24 | (2006.01) | |
| H01Q 3/24 | (2006.01) | |
| G01S 19/28 | (2010.01) | |

(52) U.S. Cl.
CPC ............ *G01S 19/36* (2013.01); *H01Q 1/243* (2013.01); *H01Q 3/24* (2013.01); *H01Q 3/44* (2013.01); *G01S 19/28* (2013.01)

(58) Field of Classification Search
CPC ......... H04B 7/185; G01S 19/36; G01S 19/28; H01Q 3/44; H01Q 3/24; H01Q 1/243
USPC .......................................................... 342/352
See application file for complete search history.

(56) References Cited

U.S. PATENT DOCUMENTS

| | | | |
|---|---|---|---|
| 6,639,560 B1* | 10/2003 | Kadambi ............... | H01Q 1/243 343/700 MS |
| 8,698,677 B2* | 4/2014 | Bungo ................... | H01Q 1/243 343/702 |
| 2003/0030594 A1* | 2/2003 | Larry ..................... | H01Q 11/08 343/895 |
| 2004/0164922 A1* | 8/2004 | Tran ........................ | H01Q 3/24 343/876 |
| 2009/0224984 A1* | 9/2009 | Nysen .................. | H01Q 1/2258 343/702 |

* cited by examiner

*Primary Examiner* — Harry Liu
(74) *Attorney, Agent, or Firm* — Coastal Patent Law Group, P.C.

(57) ABSTRACT

A modal antenna is implemented to provide a variable radiation pattern for improved global positioning system (GPS) signal reception. A multitude of antenna radiation patterns generated from a modal antenna provide the capability to optimally acquire GPS signals across a wide range of angles of arrival. Minimum radiation pattern roll-off is observed from the composite pattern generated from the multiple patterns. An algorithm is described that reduces the acquisition time for a location fix for cold and hot start conditions.

14 Claims, 9 Drawing Sheets

GPS LOCATION SYSTEM USING MODAL ANTENNA

CROSS-REFERENCE TO RELATED APPLICATIONS

This application is a continuation in part (CIP) of U.S. Ser. No. 13/557,182, filed Jul. 24, 2012;

which claims benefit of priority with U.S. Provisional Ser. No. 61/511,109, filed Jul. 24, 3011;

the contents of each of which are hereby incorporated by reference.

BACKGROUND

Field of the Invention

This invention relates to location and positioning systems for mobile communication devices; and more particularly, to an improved antenna system for GPS signal reception.

Description of the Related Art

As mobile wireless devices and applications become increasingly prevalent, location and positioning services based on global positioning systems, or "GPS systems", continue to flourish. Current GPS receiver technology allows for low cost, high performance GPS receivers to be installed in an increasing number of mobile devices.

In the United States, the FCC 911 mandate addresses the requirement for location of cell phones during emergency situations available to dispatchers. Known as "Assisted GPS", generally abbreviated as "A-GPS", is a system which can, under certain conditions, improve the startup performance, or Time To First Fix (TTFF) of a GPS satellite-based positioning system. It is used extensively with GPS-capable cellular phones to address the 911 mandate.

There is a continued need in the art for antenna systems capable of improving TTFF and other metrics associated with GPS connectivity and mobile devices, such as, for example: link budget for the GPS link and speed acquisition time.

With the advent of multi-mode, or "modal" antennas, there are presented new opportunities to explore and develop novel solutions for GPS connectivity in mobile devices.

SUMMARY OF THE INVENTION

Accordingly, it is an object of the present invention to solve these and other problems in the art by providing a multi-mode antenna with multiple radiation pattern modes to improve the link budget for the GPS link as well as speed acquisition time.

BRIEF DESCRIPTION OF THE DRAWINGS

In accordance with various embodiments, the several figures can be understood in conjunction with a thorough review of the appended description, wherein:

FIGS. 8(A-B) show amplitude and phase patterns, respectively, for a multi-mode antenna having three modes as illustrated in FIG. 7.

DETAILED DESCRIPTION OF THE PREFERRED EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions. Accordingly, the scope of the invention should not be construed as being limited to the illustrated examples, but rather, should be ascertained from the appended claims A multi-mode, or "modal" antenna, is generally any antenna that is configured to actively switch between a plurality of antenna modes, wherein in each of the plurality of modes the antenna is configured to produce a distinct radiation pattern.

Examples of structures and implementations of modal antennas are described in commonly owned U.S. Pat. No. 7,911,402, entitled "ANTENNA AND METHOD FOR STEERING ANTENNA BEAM DIRECTION," issued on Mar. 22, 2011; the contents of which are incorporated herein by reference and are summarized as follows.

Figure 1:
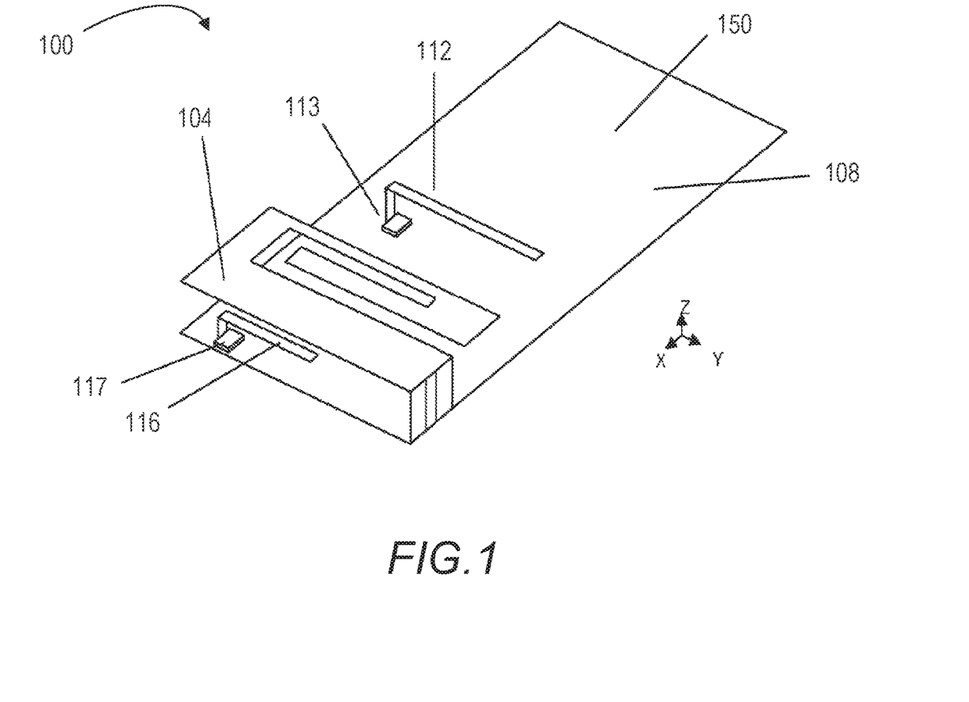
FIG. 1 illustrates an example of a modal antenna

FIG. 1 illustrates an example of a modal antenna 100, which includes an Isolated Magnetic Dipole™ (IMD) element 104 placed on a circuit board 150 forming a ground plane 108, a first parasitic element 116 coupled to an first active element 117, and a second parasitic element 112 coupled to a second active element 113. The active elements 117 and 113 may include switches that either electrically connect (short) or disconnect (open) the parasitic elements 116 and 112 to the ground plane 108. This structure allows for two different modes of operation with a common frequency corresponding to a first state where the parasitic elements 116 and 112 are shorted to the ground and a second state where the parasitic elements 116 and 112 are open. Other variations are further described in the '402 patent.

Although the above example is provided for illustration of a multi-mode antenna, it should be recognized that for GPS bands the antenna dimensions and placement of the antenna radiating element and respective parasitic elements relative to ground will be slightly varied to function at GPS bands, for example, 1.57542 GHz (L1 signal) and 1.2276 GHz (L2 signal).

In one embodiment, a GPS modal antenna is connected to a low noise amplifier (LNA), a central processing unit (CPU), and a memory bank. The memory bank stores information relating to configuration of the various antenna modes of the modal antenna. For example, a first mode might require a quantified current to be provided to a particular parasitic element positioned adjacent to a radiator portion of the GPS modal antenna. Various antenna modes will differ with regard to configuration and tuning. Several modes of the antenna are programmed and stored within the memory bank. The GPS modal antenna is configured to scan and ping various GPS satellites, and record a value for signal level of each of the GPS satellites queried. A satellite query is then performed across various antenna modes, and signal data is recorded for each mode. An optimal antenna mode is selected from the collected data based on maximum received signal, and number of satellites providing sufficient communication link quality. In this regard, an algorithm can be programmed into the CPU and memory of the antenna system, the algorithm being programmed to scan and determine an optimal antenna mode for maximizing GPS communications signal and establishing a position fix with the device. By scanning multiple antenna modes, the antenna can be configured for maximum signal efficiency, thus reducing GPS position acquisition time.

In certain embodiments, a modal GPS antenna includes an antenna radiator disposed above a ground plane and forming an antenna volume therebetween; a first parasitic element positioned within the antenna volume, the first parasitic element attached to a first active element for varying a reactance of the antenna; a second parasitic element positioned outside of said antenna volume and adjacent to the antenna radiator, wherein the second parasitic element is attached to a second active element for varying a current mode thereon. The antenna radiator is configured and the second parasitic element is adjusted in length and positioned in relation to the antenna radiator to tune the frequency response of the antenna radiator to provide for reception of signals in the GPS frequency band, and provide multiple radiation modes within the GPS frequency band.

In other embodiments, an algorithm is programmed within the memory of the device to switch antenna modes in an efficient method to reduce acquisition time for determination of a location fix. The algorithm commands the modal antenna to dwell on Mode 0 and acquire signals from various satellites within the field of view. If a time metric for signal acquisition is exceeded for one or multiple satellite signals, then the algorithm commands the modal antenna to switch to the next antenna mode and signals are acquired. The satellite signals acquired per antenna mode are stored in a data base for future reference.

In another embodiment, an algorithm is programmed within the memory of the device to reduce "Cold" and "Hot" start times for a two dimensional (2D) fix for a GPS system by conducting a survey of all modes on a modal antenna to determine the mode with the strongest signal strength from three satellites. During the initial survey of modes, the algorithm commands the mode to be used just long enough for a measure of signal strength from the three satellites with the strongest signals. The algorithm then commands the modal antenna to switch to and sample signal strength on the next mode. When all modes have been sampled the mode with the strongest three signals is selected and used to acquire a 2D location fix. All antenna modes sampled during the signal acquisition process are stored in a data base for use to determine antenna mode with highest probability of acquisition for future system usage.

In yet another embodiment, an algorithm is programmed within memory of the device and adapted to reduce "Cold" and "Hot" start times for a 2D (two dimensional) fix for a GPS system by switching to Mode 0 and sampling receive signal strength. If the received signal strength from three satellites is above a specific metric, the algorithm commands that this mode be used for location fix. If the signal strength from three satellites on this mode falls below a signal level metric, the algorithm commands the modal antenna to switch to the next mode and repeat the sampling process. All antenna modes sampled during the signal acquisition process are stored in a data base for use to determine antenna mode with highest probability of acquisition for future system usage.

In certain embodiments, the algorithm includes wherein a three-dimensional (3D) location fix is required and the algorithm samples all antenna modes to determine the mode with the four strongest signals.

In certain other embodiments, the algorithm includes wherein a three-dimensional (3D) location fix is required and the algorithm samples the first Mode and dwells on this Mode if the received signal strength from three satellites is above a specific metric. If the signal strength from four satellites on this mode falls below a signal level metric, the algorithm commands the modal antenna to switch to the next mode and repeat the sampling process. All antenna modes sampled during the signal acquisition process are stored in a data base for use to determine antenna mode with highest probability of acquisition for future system usage.

The first and second active elements can individually include any of: switches, voltage controlled tunable capacitors, voltage controlled tunable phase shifters, varactor diodes, PIN diodes, Micro-Electro-Mechanical Systems (MEMS) switches, Micro-Electro-Mechanical Systems (MEMS) tunable capacitors, Barium Strontium Titanate (BST) tunable capacitors, and field effect transistors (FET's).

In another embodiment, an algorithm is configured to acquire a location fix wherein all modes on a GPS modal antenna are surveyed and one or a combination of modes are used to determine a location fix. If two or less satellites can be acquired during a specific timeframe, a base station is accessed using the A-GPS system to determine a unique location.

In another embodiment, a multimode antenna comprises: an antenna radiator disposed above a ground plane and forming an antenna volume there between; a first parasitic element positioned within the antenna volume, the first parasitic element attached to a first active element for varying a reactance of the antenna; a second parasitic element positioned outside of said antenna volume and adjacent to said antenna radiator, the second parasitic element attached to a second active element for varying a current mode thereon. The antenna radiator is configured and the second parasitic element is adjusted in length and positioned in relation to the antenna radiator to tune the frequency response of the antenna radiator to provide for reception of signals in one or multiple cellular or communication frequency bands, and provide multiple radiation modes within the one or multiple frequency bands. Wherein pilot signals from two or more base stations are received with the multimode antenna; multiple radiation modes are used to measure the pilot signals and the received power level of the pilot signals for multiple modes are measured and stored in memory in a microprocessor or other memory located on the mobile device that the multimode antenna is connected to. The receive signal levels are compared to a data base of stored radiation patterns for the multiple modes, and a measure of angle of arrival of the pilot signals are performed. An intersection of rays or lines parallel to the angle of arrival of two or more pilot signals are used to determine a location fix.

In another embodiment, a multimode antenna includes a tunable component with two or more tuning states being connected to the second parasitic element to alter the reactance of the second parasitic element. The tunable component is adjusted to steer the null, or low signal region, and pilot signals are monitored as the null of the radiation pattern of the multimode antenna is steered. A measure of the receive signal strength of multiple pilot signals is performed and the angle of arrival of two or more pilot signals is determined. An intersection of rays or lines parallel to the angle of arrival of two or more pilot signals, are used to determine a location fix.

In another embodiment, the location information derived from the antenna system is sent to the GPS receiver and used to update location information in the GPS system.

Figure 2:
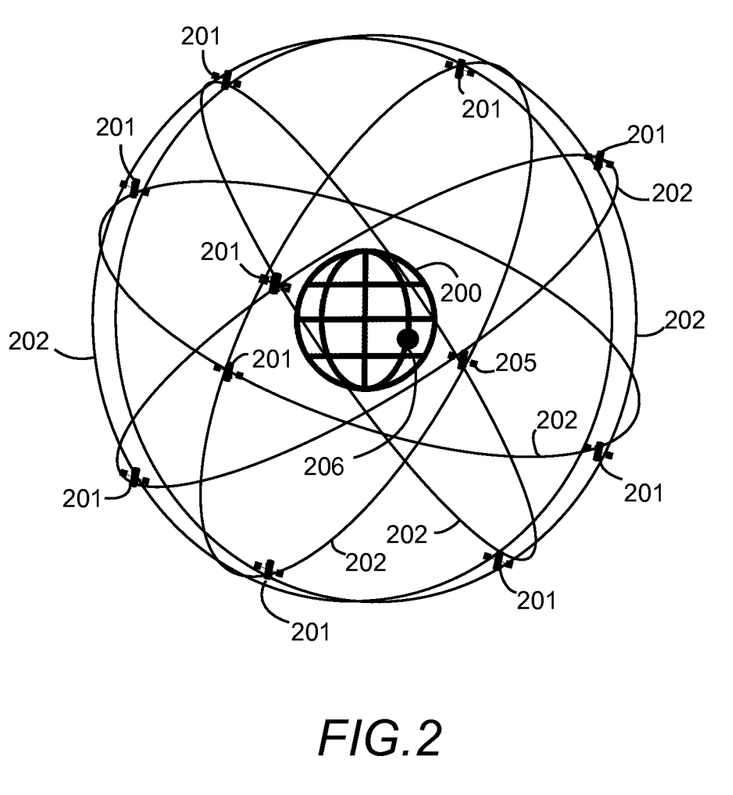
FIG. 2 shows the compliment of GPS satellites orbiting the Earth, to form the GPS constellation; wherein a variable number of satellites are in the field of view of the receiving antenna at any point in time.

Now turning to the illustrative embodiments, FIG. 2 shows the compliment of GPS satellites 201 orbiting the Earth 200, to form the GPS constellation; wherein a variable number of satellites 205 orbiting the earth are in the field of view of the receiving antenna 206 at any point in time. As shown, multiple satellites are orbiting the Earth along various paths 201 at a given time, and only a portion of those satellites 205 are in the field of view of receiving antenna 206 at that time, however, this changes with movement of the Earth and respective satellites. Using the global positioning system, a minimum of three satellites are required to obtain a two-dimensional location fix, and at least four satellites are required for a three-dimensional location fix.

Figure 3:
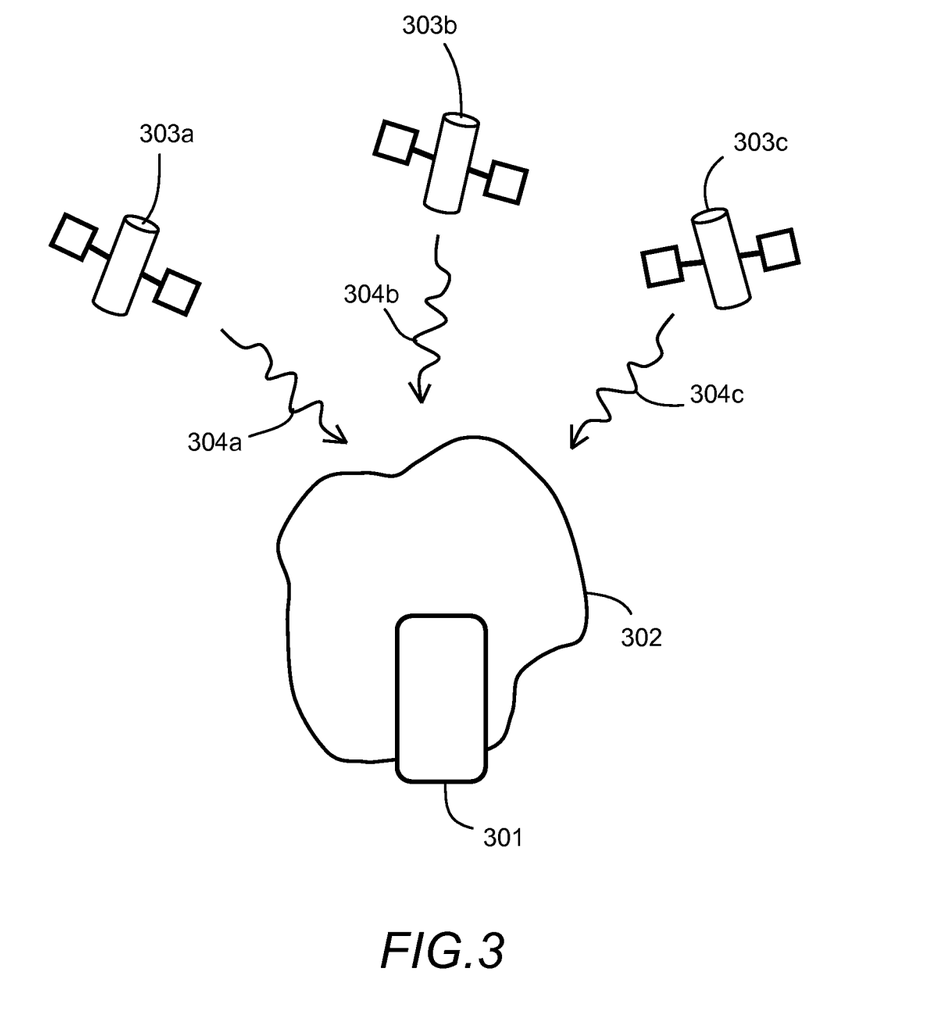
FIG. 3 shows a mobile device with a passive GPS antenna, with a fixed radiation pattern, the device being in the field of view of "N" GPS satellites.

FIG. 3 shows a mobile device 301 with a passive GPS antenna having a fixed radiation pattern 302, the device being in the field of view of "N" GPS satellites 303a; 303b; and 303c, respectively. Signals 304a; 304b; 304c are communicated between the respective satellites and the GPS antenna for determining a position. The passive antenna generally creates a radiation pattern with at least one null, and where there is a decrease in signal strength the GPS acquisition process can be delayed or the process may fail. Since there are a limited number of GPS satellites in the field of view of a device at a given point in time, it is important to receive signals efficiently for faster location determination.

Figure 4:
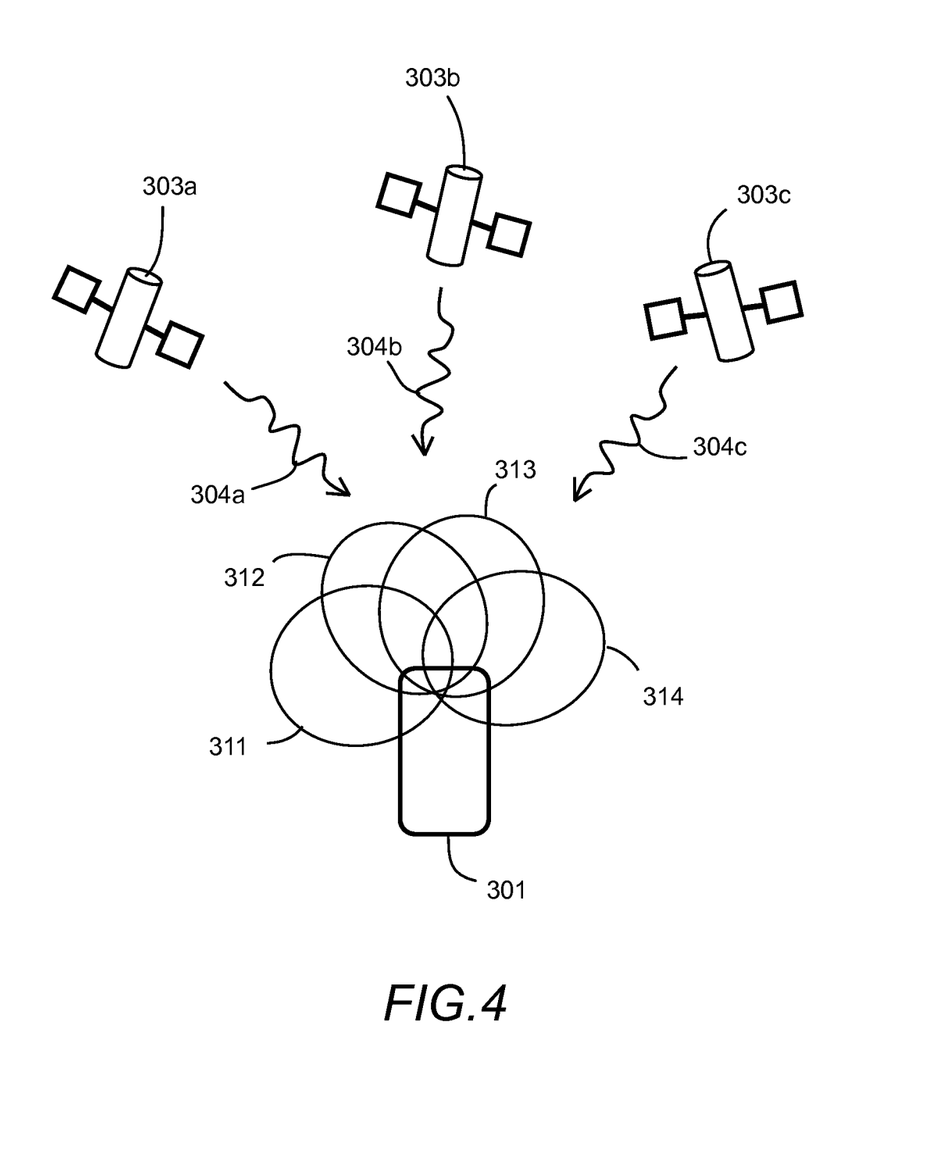
FIG. 4 shows a mobile device with a multi-mode GPS antenna, having multiple radiation patterns each associated with a respective mode of the antenna, the device being in the field of view of "N" GPS satellites.

In accordance with an embodiment herein, FIG. 4 shows a mobile device 301 with a multi-mode GPS antenna having multiple radiation patterns 311; 312; 313; and 314, each radiation pattern being associated with a respective mode of the antenna, and the device being in the field of view of "N" GPS satellites 303a; 303b; 303c. Here, the antenna system can sample a variety of antenna radiation patterns to determine the mode of the antenna which provides the optimum link for receiving signals 304a; 304b; 304c, respectively.

Figure 5:
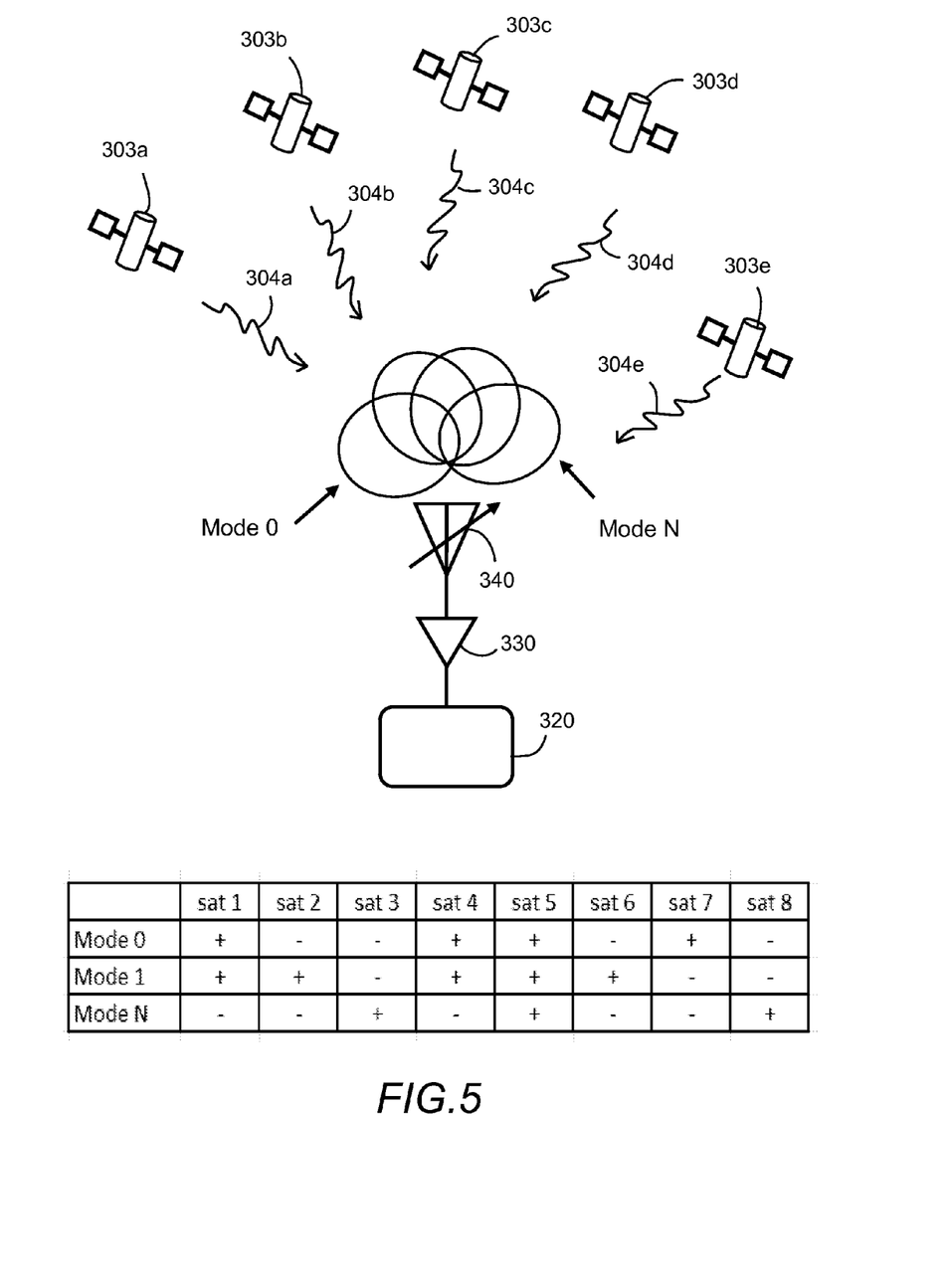
FIG. 5 shows a mobile device with a multi-mode GPS antenna, having multiple radiation patterns each associated with a respective mode of the antenna, the device being in the field of view of "N" GPS satellites; wherein the number of satellite signals per mode is stored in a look-up table within the processor for achieving rapid acquisition of multiple signals for a location fix.

FIG. 5 shows a mobile device with a multi-mode GPS antenna having multiple radiation patterns each associated with a respective mode of the antenna (Mode 0, . . . , Mode N), the device being in the field of view of "N" GPS satellites 303a; 303b; 303c; 303d; and 303f; wherein the number of satellite signals per mode is stored in a look-up table within the processor 320 for achieving rapid acquisition of multiple signals for a location fix. The antenna system comprises a processor 320 having a lookup table stored therein; the processor is coupled to a low noise amplifier (LNA) 330, which is further coupled to a modal antenna 340. The lookup table stores information relating each satellite signal relative to each antenna mode (Mode 0, Mode 1, and Mode N). In this regard, the information related to each satellite for each mode can be quickly accessed and processed to determine an optimal antenna mode for acquiring position information using GPS.

Figure 6:
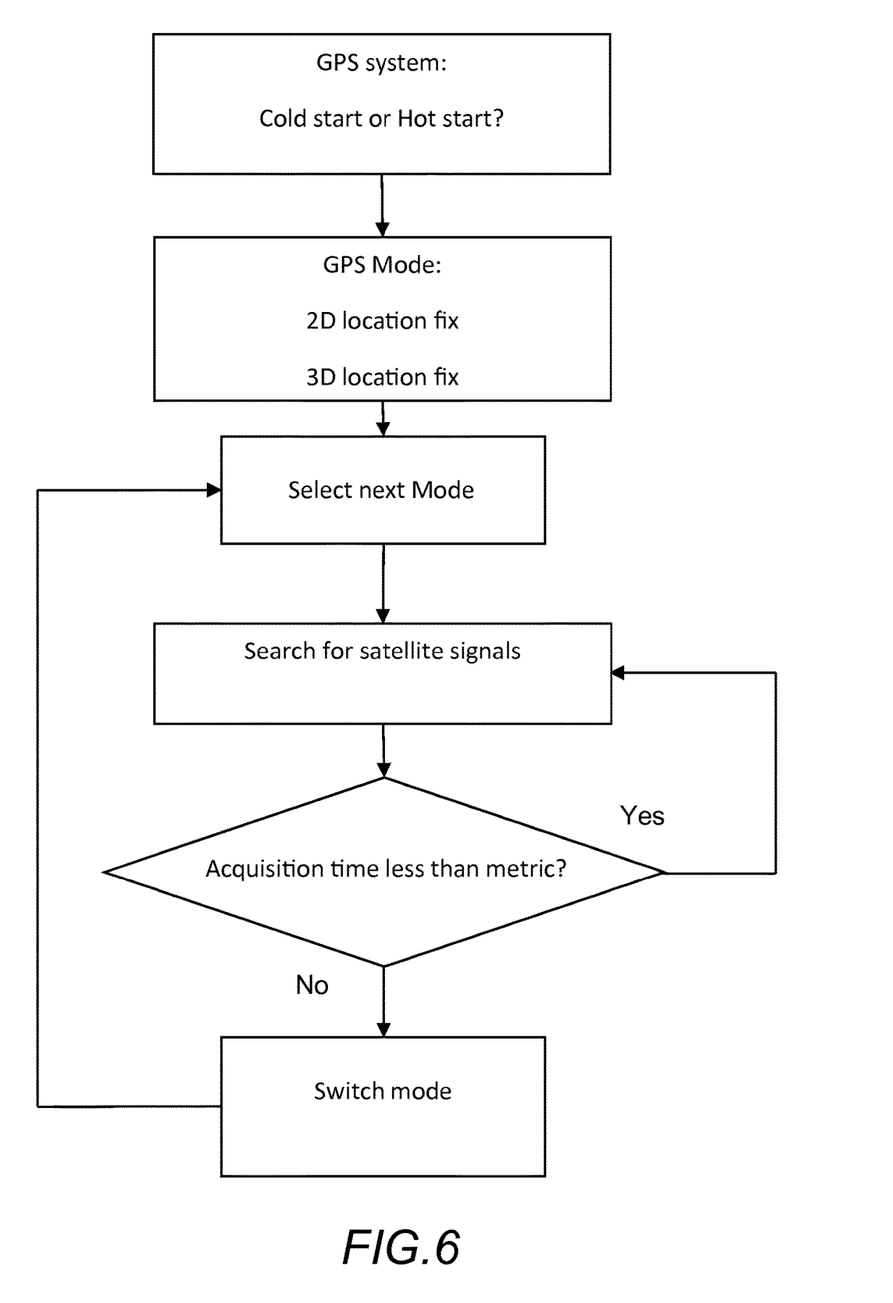
FIG. 6 shows a flowchart of a modal antenna acquisition process; the process leads to a more rapid location fix of a GPS system for both "cold" and "hot" starts, and takes into account the desire or requirement for a 2D or 3D location fix.

FIG. 6 shows a flowchart of a modal antenna acquisition process; the process leads to a more rapid location fix of a GPS system for both "cold" and "hot" starts, and takes into account the desire or requirement for a 2D or 3D location fix. The process begins with a determination between "cold start" and "hot start", and whether a 2D location or 3D location fix is needed. The antenna system then cycles through each mode, selecting the next mode in order and searching for satellite signals. Upon discovering a satellite signal the acquisition time is measured against a pre-determined metric, and the result is determined. If the acquisition time is not less than the required metric, the antenna system iterates to a subsequent mode and repeats until an acceptable number of satellite signals, depending on 2D or 3D location requirement, are obtained.

Figure 7:
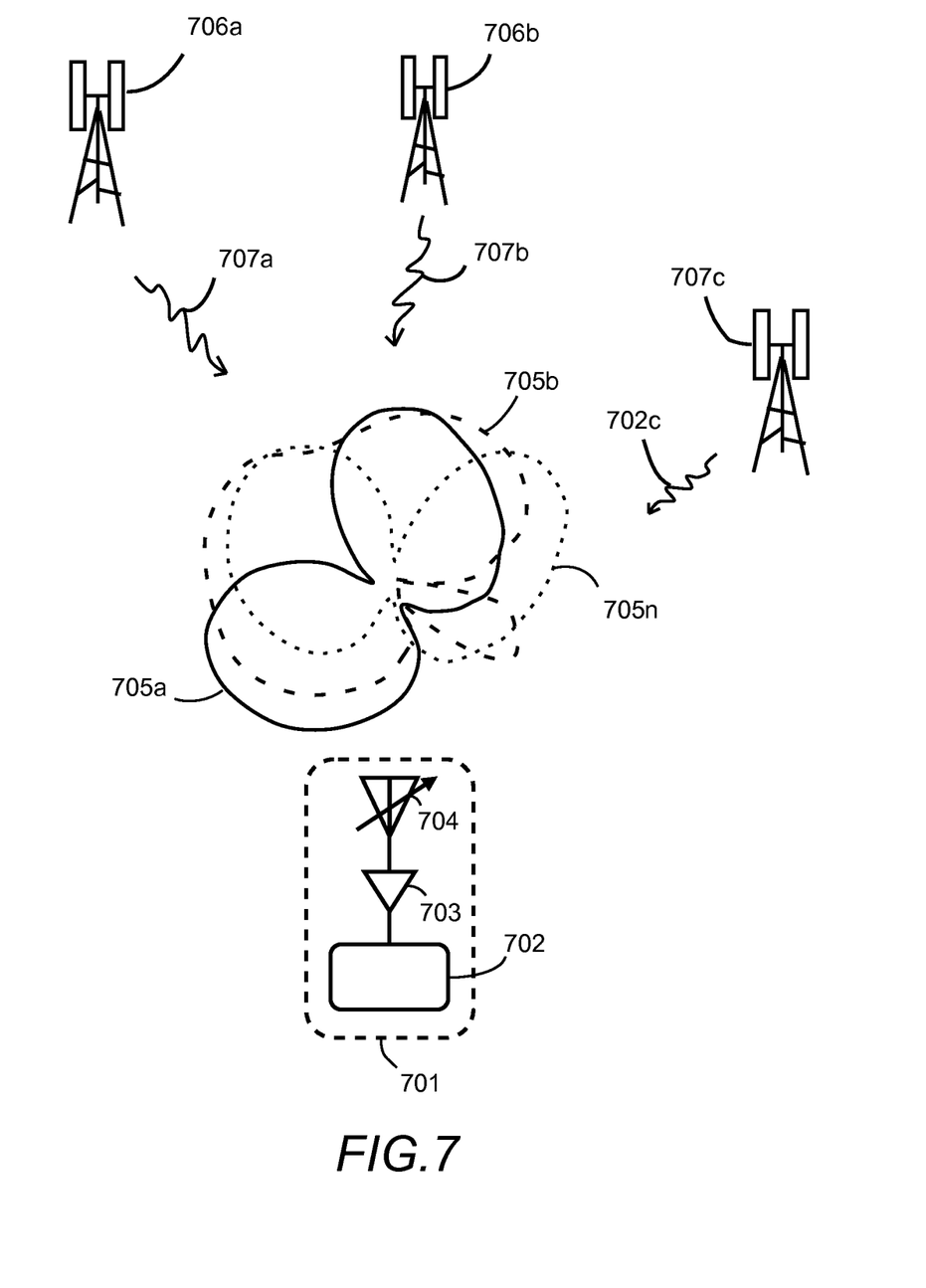
FIG. 7 shows a device with a multi-mode cellular antenna positioned within the field of view of three base stations, the antenna having three antenna modes, wherein a processor within the mobile device is configured to access pre-stored radiation pattern data for each of the antenna modes to use a reference for comparison with real-time measurements and to estimate angle of arrival of received signals from the base stations.

In another embodiment, and using a cellular network as opposed to GPS, FIG. 7 shows a device 701 with a multi-mode cellular antenna positioned within the field of view of three base stations 706a; 706b; 706c, respectively, the antenna having three antenna modes 705a; 705b; 705n, wherein a processor 702 within the mobile device is configured to access pre-stored radiation pattern data for each of the antenna modes to use a reference for comparison with real-time measurements and to estimate angle of arrival of received signals from the base stations. The antenna system generally comprises a modal antenna 704 coupled to an LNA 703 and a processor 702. The processor is coupled to memory with a lookup table containing information relating various antenna modes and corresponding radiation patterns.

Here, the antenna radiator is configured and the second parasitic element is adjusted in length and positioned in relation to the antenna radiator to tune the frequency response of the antenna radiator to provide for reception of signals in one or multiple cellular or communication frequency bands, and provide multiple radiation modes within the one or multiple frequency bands. Wherein pilot signals from two or more base stations are received with the multimode antenna; multiple radiation modes are used to measure the pilot signals and the received power level of the pilot signals for multiple modes are measured and stored in memory in a microprocessor or other memory located on the mobile device that the multimode antenna is connected to. The receive signal levels are compared to a data base of stored radiation patterns for the multiple modes, and a measure of angle of arrival of the pilot signals are performed. An intersection of rays, or lines parallel to the angle of arrival of two or more pilot signals, are used to determine a location fix.

Figure 8A:
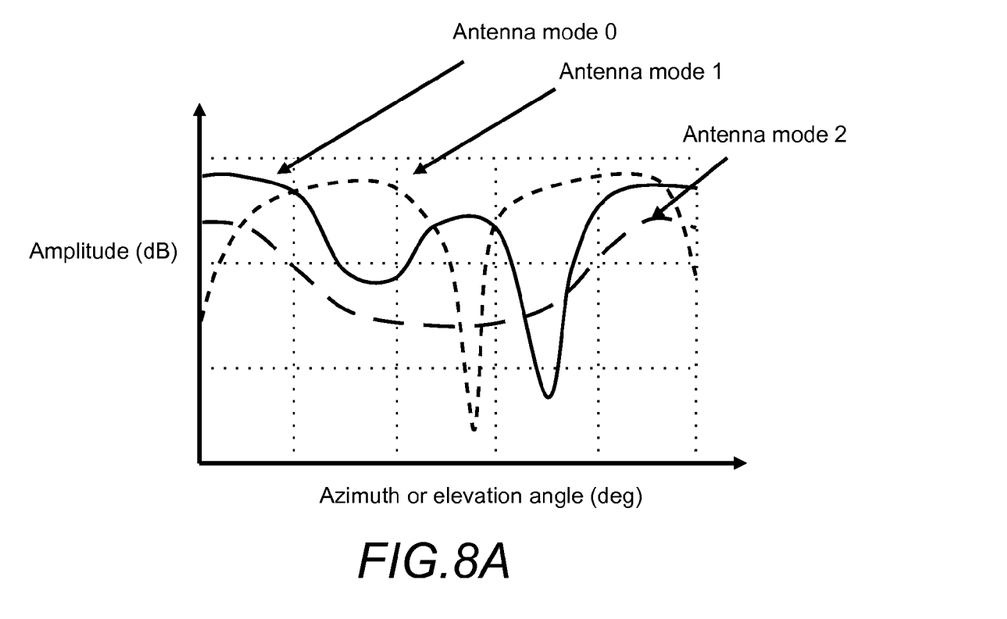

FIG. 8A shows amplitude (dB) vs. azimuth or elevation angle (deg) for a multi-mode antenna having three modes as illustrated in FIG. 7.

Figure 8B:
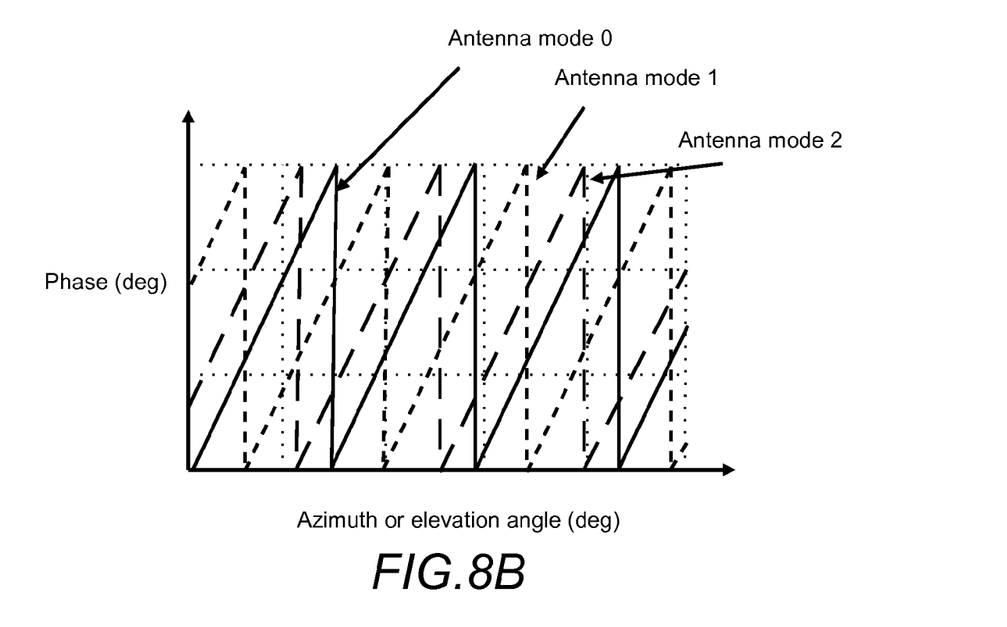

FIG. 8B shows phase (deg) vs. azimuth or elevation angle (deg) for a multi-mode antenna having three modes as illustrated in FIG. 7.

Figure 9:
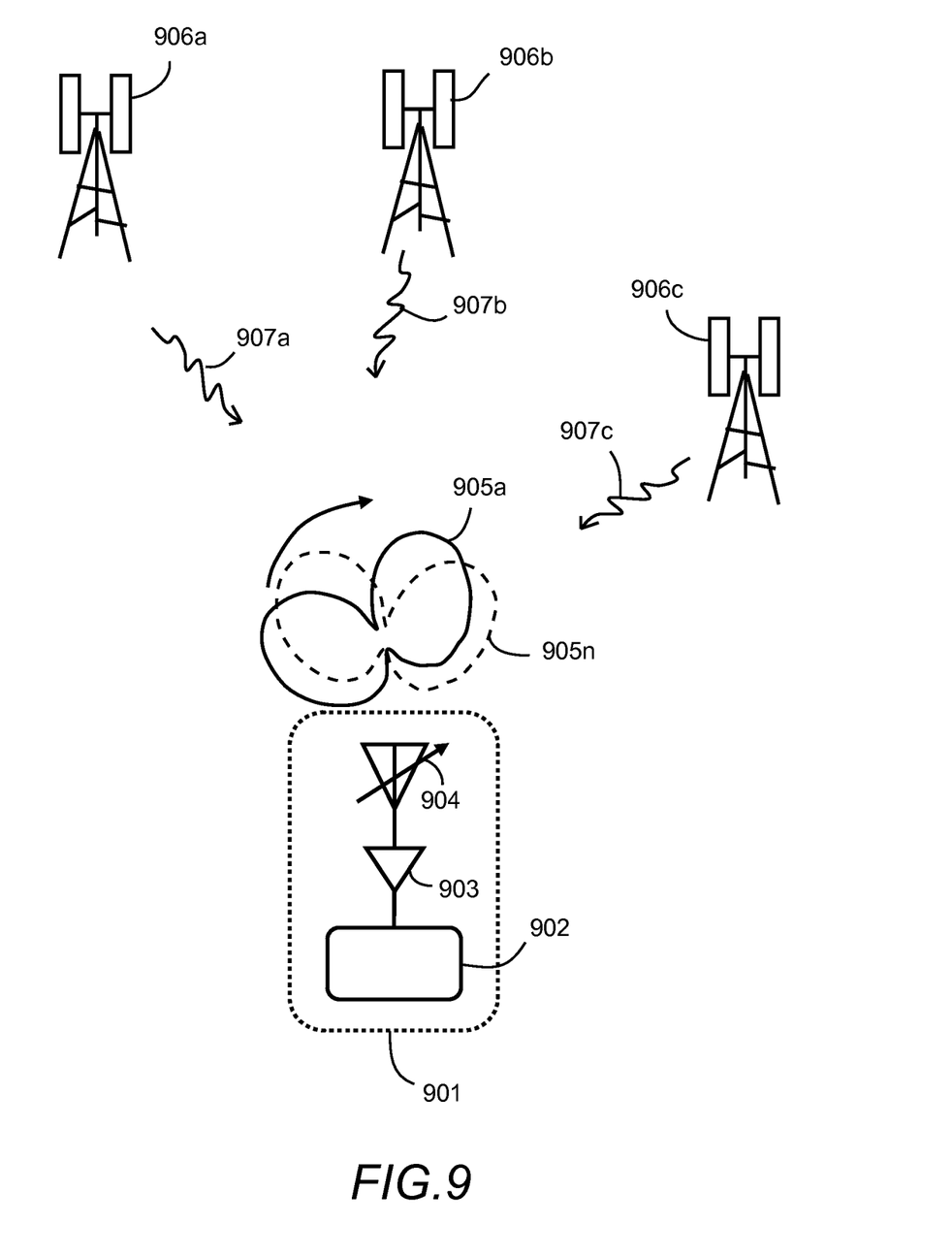
FIG. 9 shows a device with a multi-mode cellular antenna positioned within the field of view of three base stations, the antenna having multiple antenna modes and configured to produce a variable antenna radiation pattern; wherein the null in the radiation pattern is steered to scan the pilot signals from the base stations, and the angle of arrival is determined by null position for the lowest received signal for the pilot signal under test.

FIG. 9 shows a device 901 with a multi-mode cellular antenna positioned within the field of view of three base stations 906a; 906b; 906c, the antenna having multiple antenna modes and configured to produce a variable antenna radiation pattern 905a, . . . , 905n; wherein the null in the radiation pattern is steered to scan the pilot signals 907a; 907b; 907c from the base stations, and the angle of arrival is determined by null position for the lowest received signal for the pilot signal under test. The multi-mode cellular antenna comprises a processor 902 coupled to an LNA 903, which is further coupled to a multi-mode antenna 904.

We claim:

1. An antenna system configured for acquisition of a device location, the antenna system comprising:
    an antenna radiating element positioned above a circuit board and forming an antenna volume therebetween;
    a first parasitic element positioned within the antenna volume and coupled to a first active element for varying a reactance of the antenna;
    a second parasitic element positioned outside of the antenna volume and adjacent to the antenna radiating element, the second parasitic element is attached to a second active element for varying a current mode thereon;
    the antenna radiating element, first parasitic element, and second parasitic element being configured with a length and proximity for operation in GPS frequency bands;
    wherein the antenna system is configured to produce a plurality of radiation patterns when configured in each of a plurality of modes, each of said plurality of modes being set with a distinct configuration of the first and second active elements, and with each of said radiation patterns being distinct in each mode.

2. The antenna system of claim 1, said antenna coupled to a low nose amplifier (LNA) and a processor; the processor being coupled to memory storing information relating each of the plurality of modes of the antenna with the corresponding radiation patterns; wherein the antenna system is configured with an algorithm for determining an optimal radiation pattern and associated mode of the antenna system.

3. The antenna system of claim 1, wherein said GPS frequency bands include at least: 1.57542 GHz and 1.2276 GHz.

4. The antenna system of claim 1, wherein said first and second active elements are individually selected from: switches, voltage controlled tunable capacitors, voltage controlled tunable phase shifters, varactor diodes, PIN diodes, Micro-Electro-Mechanical Systems (MEMS) switches, Micro-Electro-Mechanical Systems (MEMS) tunable capacitors, Barium Strontium Titanate (BST) tunable capacitors, and field effect transistors (FET's).

5. With the antenna system of claim 1, a method for acquisition of a device location, the method comprising:
    configuring the antenna system in a first mode by adjusting the first and second active elements;
    acquiring signals from one or more GPS satellites within a field of view of the antenna system;
    for each satellite signal acquired, measuring a time for signal acquisition and comparing said time for signal acquisition to a pre-determined threshold value; wherein:
    if a time for signal acquisition is less than the threshold value for one or more of the acquired satellite signals, then configuring the modal antenna in a second mode.

6. The method of claim 5, further comprising:
    with the antenna system configured in the second mode, acquiring signals from one or more of the GPS satellites within the field of view of the antenna system;
    for each satellite signal acquired, measuring a second time for signal acquisition and comparing said second time for signal acquisition to the pre-determined threshold value; wherein:
    if a time for signal acquisition is less than the threshold value for one or more of the acquired satellite signals, then configuring the modal antenna in a subsequent mode.

7. The method of claim 6, further comprising:
    storing information from each of the satellite signals acquired per each respective antenna mode in a database for future use.

8. The method of claim 7, further comprising:
    with the information stored in the database,
    determining an optimal antenna mode from the plurality of modes having the strongest acquired signals from three or more satellites, and
    configuring the antenna in the optimal antenna mode for determining a location fix.

9. The method of claim 8,
    wherein the optimal antenna mode from the plurality of modes that is selected is the mode having the three strongest acquired signals from the GPS satellites in the field of view of the antenna system.

10. The method of claim 8,
    wherein the optimal antenna mode from the plurality of modes that is selected is the mode having the four strongest acquired signals from the GPS satellites in the field of view of the antenna system.

11. The method of claim 6, further comprising:
    determining an optimal antenna mode from the plurality of modes
    wherein the optimal antenna mode is the first mode sampled that acquires three or more signals with each having a signal strength above a pre-determined signal strength threshold, and
    configuring the antenna in the optimal antenna mode for determining a location fix.

12. The method of claim 11, wherein the optimal antenna mode is the first mode sampled that acquires three signals with each having a signal strength above the pre-determined signal strength threshold.

13. The method of claim 11, wherein the optimal antenna mode is the first mode sampled that acquires four signals with each having a signal strength above the pre-determined signal strength threshold.

14. The method of claim 7, wherein a location fix is determined using the antenna configured in two or more of said modes.

* * * * *